INVENTORS
JAMES W. SCHROEDER
ANTHONY C. NASO
BY PAUL R. ESCHENAUER

Robert S. Dunham
ATTORNEY

United States Patent Office 3,649,708
Patented Mar. 14, 1972

3,649,708
PURIFICATION OF NAPHTHALENE
James W. Schroeder, Parma, Anthony C. Naso, Parma Heights, and Paul R. Eschenauer, Cleveland, Ohio, assignors to Republic Steel Corporation, Cleveland, Ohio
Filed Oct. 16, 1969, Ser. No. 867,022
Int. Cl. C07c 7/14
U.S. Cl. 260—674 N    31 Claims

ABSTRACT OF THE DISCLOSURE

Crude naphthalene, such as from coke oven gas, is dissolved in methanol at elevated temperature and the continuously established solution is repeatedly circulated through a crystallizer while rapidly scraping the shell and exteriorly cooling the same with rapidly flowing water, to establish a continuously circulating slurry of purified naphthalene crystals. A withdrawn flow of the slurry is continuously filtered under pressure in a rotating drum filter wherein the entrained filtrate in the cake of crystals is displaced with methanol and the crystals are then removed to collect in a heated region from which melted naphthalene is withdrawn while maintaining filter pressure, the entrained methanol being thereafter recovered from the naphthalene by vaporization, yielding refined naphthalene as product. Slurry feed to the filter and solution supplied to the crystallizer are controlled to maintain constant temperature in the recirculating slurry and provide uniformity of crystal content in the slurry feed. The filtrate is in part distilled to recover pure methanol and in part reused in making up the crude naphthalene solution, i.e. in admixture with pure methanol in proportion appropriate for continuing attainment of a selected purity of naphthalene product.

BACKGROUND OF THE INVENTION

This invention relates to the purification of naphthalene and more particularly to procedure and apparatus for treating crude naphthalene to produce a substantially refined product, a chief object being to afford a continuous process of reliable, efficient and economical character, that can be readily controlled to yield a naphthalene product of predetermined purity.

In an important specific aspect, the invention is concerned with the continuous purification of crude naphthalene obtained from coke oven gas, sometimes called coal tar naphthalene, and indeed in one sense, the novel methods herein disclosed can be deemed part of a complete operation which includes separation of crude naphthalene from such gas and then purifying the crude naphthalene as hereinbelow disclosed. As is well known, naphthalene is one of the constituents of coke oven gas produced in the conventional oven process for converting coal to coke, and quantities of naphthalene are usually found and recoverable at several stages of the standard series of treatments to which such gas is subjected to obtain various products therefrom. Thus a considerable quantity of tar is usually first removed from the coal gas, and constitutes one source of naphthalene. At a later stage in the treatment of the remaining material in gaseous state, it is passed through a so-called final cooler, from which the cooling water or cooling oil removes a proportion of various materials including naphthalene, by condensation or absorption. Thereafter a conventional treatment involves scrubbing the gas with a petroleum wash oil or the like, which effectively removes the remaining naphthalene in an intermediate product called light oil.

The actual separation of crude naphthalene from the above mixtures at one or another of the described stages of coke gas treatment is achieved in various ways, one such being distillation, which may, depending on the composition of the mixture, involve boiling the naphthalene away from other components or recovering the naphthalene as a residue from lower-boiling materials. In the case of tar, a distillation may be employed to carry off one or more oil fractions from which, by appropriate washing or other treatment, a crude naphthalene can be separated, such separation sometimes involving crystallization from the so-called carbolic oil that resulted from the first-mentioned distillation or topping treatment of the tar. From the final cooler water, crude naphthalene is recoverable in a so-called sump operation, as by settling in a melted state, while the yield of crude naphthalene from so-called light oil is commonly obtained in a batch distillation of the residue from one or more first distilling stages.

Naphthalene, which is a substance of numerous uses, notably in the chemical and like industries where it is an important starting material, can be produced in a variety of degrees of purity. A common measure of naphthalene purity is the solidification point (s.p); for example naphthalene having a solidification point of 77.5° C. or higher, is considered pure for many purposes, whereas a product having a substantially lower solidification point is currently deemed crude and is commercially of much less value. Naphthalene of essentially absolute purity has a solidification point slightly in excess of 80° C.

Even though processes are known and used in the chemical industries for purifying naphthalene by fractional distillation, or recrystallization, or acid or other chemical treatment (reaction purification), or in other ways such as physical separation at room temperature, there still has remained a need for an economical process, preferably of a continuous character, which is designed to handle relatively quite crude naphthalene, as in the range downward from 75° C. s.p. to 60° C. s.p., when recovered from one or another of the stages of the treatment of coke oven gas. The requirements are, as stated, for a process that is essentially simple, that requires no significant consumption of costly chemicals, and that is operative to effect a separation of naphthalene from other substances, including other aromatic compounds of difficult separability, i.e. substances which may form azeotropic mixtures or solid solutions with naphthalene and which therefore are hard to remove by methods depending on change of state. Furthermore, the production of coke oven gas must be considered or accommodated as an essentially continuing operation, with the consequent desirability of a continuous process when purification is contemplated for a by-product such as naphthalene.

As indicated, the accompaniment of crude naphthalene by impurities that have closely similar boiling points or that form azeotropes with it, such as benzothiophene, acetophenone, methyl naphthalenes and others, greatly complicates efforts to purify the material by fractional distillation. Washing with reagents such as sulfuric acid is correspondingly expensive, and while it has been known that the temperature-dependent solubility of naphthalene in various solvents including lower alcohols will theoretically afford a way of producing crystalline naphthalene separate from accompanying impurities, and while a number of processes of recrystallization or flash crystallization or the like have been proposed, their utility has appeared to be limited by requirements for batch operation, or long retention times in the system, or otherwise. Water-alcohol mixtures have been considered for recrystallization procedures, since it appears that the solubility of naphthalene is depressed, with theoretically higher yield, but such proposals have failed to recognize that the system becomes less selective for impurities, while recovery of solvent may be impeded because water forms an azeotropic mixture with some solvents, and particularly with naphthalene itself, and indeed with some commonly occurring impurities.

A principal object of the invention is therefore to meet the above-stated need for an improved, preferably continuous process of purifying naphthalene, especially coal tar naphthalene such as derived from various by-product fractions of a coke plant. Particular objects are to afford such procedure and apparatus whereby economy of necessary agent material, e.g. solvent, and of other factors such as coolant, heat energy and the like, can be achieved, while at the same time the system is mechanically and physically reliable and the operation may at least in substantial measure be automatically controlled for delivery of a naphthalene product having a predetermined degree of purity. Whereas some prior art methods have been designed for converting relatively pure naphthalene to a state of essentially absolute purity and while others may have been effective to approach but not reach a desired commercial grade of purity from a very crude supply, a special aim of the present invention is to afford unusual efficiency in converting a relatively crude naphthalene, as of about 70° C. s.p. or less to a grade of acceptable commercial purity, e.g. 77.5° C. or higher, preferably to 78° C. s.p.

SUMMARY OF THE INVENTION

To the foregoing and other ends, the process of the invention involves treating impure or crude naphthalene by establishing it in solution in a solvent wherein its solubility is significantly temperature-dependent, then effecting recrystallization of the naphthalene, e.g. on a cooled, continuously scraped surface exposed to the solution, separating the naphthalene for delivery as product and recovering the solvent for re-use, e.g. in part by direct recirculation of the used solution as mother liquor and in part by distilling it, advantageous specific features of the complete procedure being that it is essentially continuous through all steps and is carried out in a substantially closed system, whereby losses are minimized and balance is readily maintained with respect to crude naphthalene feed, discharges of pure product and of residue, and appropriate stages or operations of recirculation.

Although other solvent liquids can be employed in some cases, particularly other lower alcohols such as ethanol, n-propanol and isopropanol, unusual advantage has been discovered for the purification of naphthalene by recrystallization, especially naphthalene derived from coke oven gas, in employing methanol as the solvent. Not only is methanol relatively inexpensive, but its extremely low boiling point greatly facilitates recovery and separation from all other materials while its solubility curve, for naphthalene, is fully appropriate. A further special advantage of methanol is that it does not form an azeotropic mixture with water so that even though a greatly preferred characteristic of the present procedure is an avoidance of water in the system, methanol is more readily recoverable, without water contamination, by distillation.

A particular feature of the present improvements in naphthalene purification involves recirculation of the methanol solution of naphthalene through an elongated crystallizing zone, as for example a series of scraped-shell crystallizer units, while the enclosing surface is exteriorly cooled as by flow of water and the interior surface is continuously scraped to establish the naphthalene crystals in slurry form, both the recirculation of the slurry and the scraping action being effected at relatively high speeds so that no more than a very thin layer of crystals ever accumulates on the cooled surface. Not only does the corresponding turbulent flow of the solution, or rather the slurry, promote heat transfer at the cooled surface, but the avoidance of a heavy layer of product greatly enhances the thermal efficiency, inasmuch as solid naphthalene has extremely poor heat transfer properties. By the described operation efficient results are obtained, and indeed, with the special coaction of the solubility properties of methanol and the temperature characteristics thereof, the operation is notably effective when the coolant is simply water as supplied at ordinary ambient temperatures.

In further accordance with the invention, the circulating slurry of naphthalene crystals in the methanol solution is continuously tapped to deliver a discharge flow, which is preferably minor in amount relative to the flow traversing the crystallizers, and the purified naphthalene is then separated from the so-discharged slurry. While centrifugal or yet other modes of separating the crystals are conceived as suitable in some cases, unusual advantage is found in continuous filtration under pressure. Thus the slurry is continuously delivered to the inlet or cake side of a moving filter screen, e.g. a rotating drum filter, while a positive, i.e. moderate super-atmospheric pressure is maintained, both in the supplied liquid and in appropriate enveloping gas, e.g. air or very preferably inert gas such as nitrogen. With suitable pressure drop across the filter element solid naphthalene is deposited and then appropriately scraped from the surface, pressure filtration being not only more manageable than vacuum filtration but particularly appropriate for minimizing evaporation of methanol and thus for facilitating recovery of filtrate and methanol in the manner explained below.

A further feature of advantage involves melting the crystalline naphthalene in a suitable lower part of the filter, i.e. in the enclosed, pressurized space, whereby the liquid naphthalene affords a pressure seal for its ready, and preferably continuous, withdrawal in liquid state. Control of slurry flow to the filtration step is effected, with notable advantage, in relation to the temperature of the main body of slurry recirculating through the crystallizing zone. In particular, the amount of slurry withdrawal, i.e. flow, is controlled to maintain a constant temperature in the recirculating body, the withdrawn flow being increased or decreased according as the recirculating temperature departs below or above the desired point, an accompanying significant result being to maintain a substantially constant percent of solids in the feed to the filtration step. A cooperating feature of the process is that the slurry pressure to the filter is conveniently established and governed by the controlled pressure of the supply of crude naphthalene solution flowing to the crystallizing operation, a consequence of this feature being that no heat of pumping is introduced into the product slurry as might otherwise impair efficiency by redissolving some of the naphthalene.

From the filtration, the melted naphthalene is dried of methanol, as by continuous flash evaporation, yielding the desired, purified product while recovering the methanol for reuse.

The filtrate, after separation from any accompanying gas, is advantageously divisible into two flows, in that a notably advantageous procedure involves recirculating a substantial proportion to the original mixing zone for association with a proportion of pure methanol to effectuate continuing supply of solution of crude naphthalene to be processed through the crystallizing stage. The remaining portion of filtrate is subjected to distillation for recovery of pure methanol to be reused, leaving a residue which consists of the now-separated impurities and a relatively minor proportion of the original naphthalene, and which can be processed for other purposes.

Another special aspect of the invention resides in the control of the mutual proportion of filtrate, i.e. used methanol solution, and pure methanol, as supplied to the solution-establishing or mixing stage, it being discovered that such ratio can be adjusted to maintain a predetermined level of purity in the ultimate naphthalene product. By reducing the proportion of recirculated filtrate the circulating load of impurities is stabilized at a lower level, or alternatively at a higher level, and in all cases the adjustment is such as to maintain a selected stability. In consequence the purity of the product, e.g. as measured by solidification point, is kept from departing below the desired value, while efficiency is maximized by avoiding over-purification such as would involve a correspondingly increased loss of naphthalene in the residue from that fraction of filtrate which is treated to recover pure methanol.

A still further feature of significance for the process resides in uniquely appropriate procedure for start-up, i.e. for initiating the crystallizing operation. Thus assuming that from the mixing stage, a methanol solution of naphthalene is delivered at a selected temperature, and circulation of such solution is commenced through the crystallizing zone, the coolant flow, e.g. for the crystallizer shell, is initiated at a temperature only slightly below that of the impure solution, while scraping of the shell is begun and thereafter continued without interruption. As crystals begin to deposit on the shell, the coolant temperature is reduced, eventually to a desired operating point (which may, for example, be the normal temperature of the water supply used for coolant) quite substantially below the temperature of the solution leaving the mixer. In this fashion, i.e. by gradually increasing the temperature difference between the coolant water and the solution, there is effective avoidance of premature, excessive crystal deposit, particularly along the first-reached portion of the crystallizer surface, and there is corresponding, properly gradual build-up of the desired thin layer of crystals that are continuously scraped for removal, throughout the entire zone. Choking of the crystallizing path is avoided and likewise obstruction to scraper operation, and of equal importance, there is no undue thickness of crystal layer anywhere such as would seriously impair the efficiency of heat transfer.

The procedure is effectively continuous throughout while the system is conveniently kept in closed condition, with maximum economy of methanol, of pressurized gas and of various supplies of heat. At the several stages, and indeed overall, the process lends itself to effective automatic control. Still further novel features of both the procedure and apparatus are set forth or apparent in the detailed description, hereinbelow, of a presently preferred embodiment.

DETAILED DESCRIPTION

Figure 1:
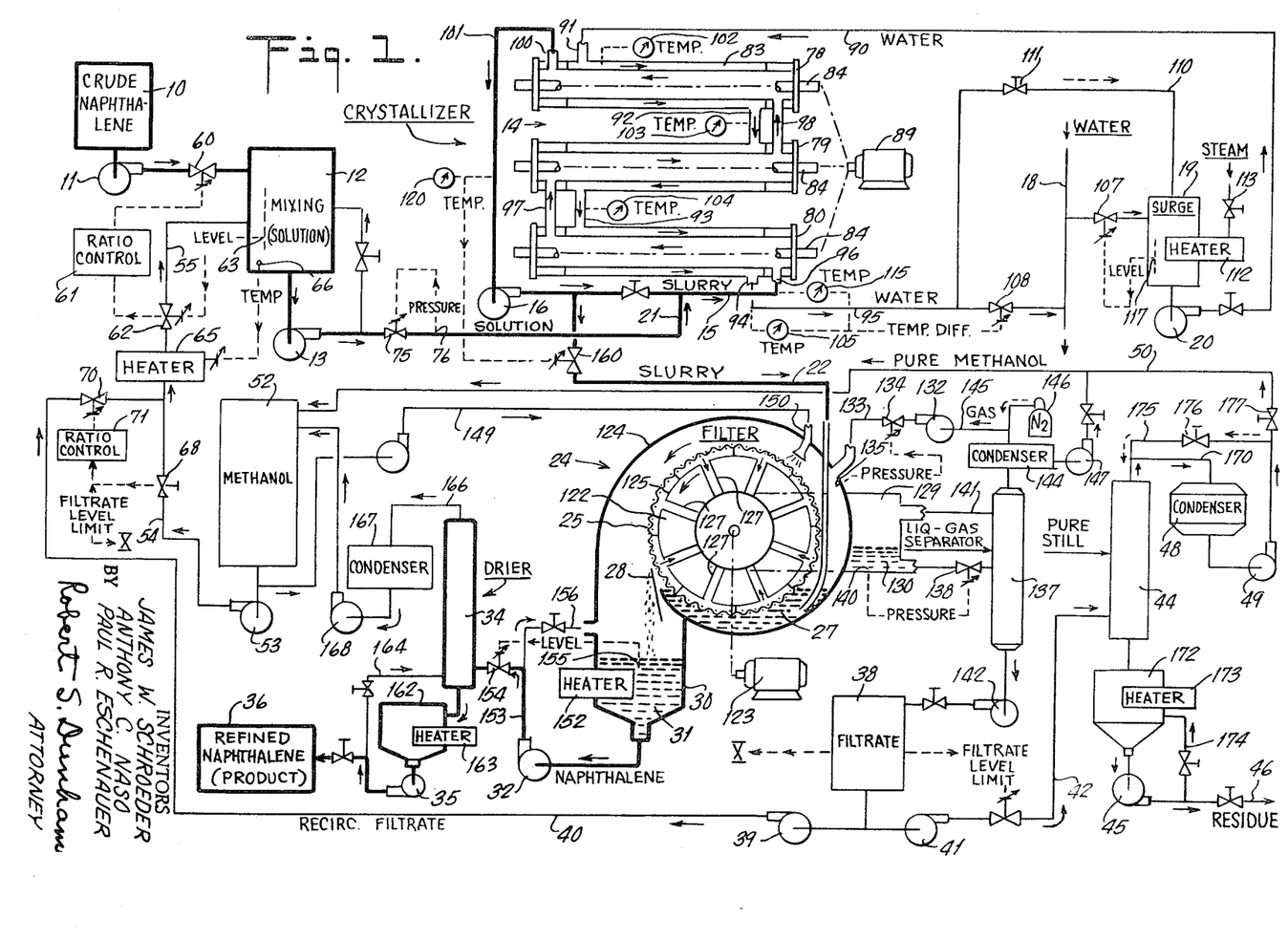
FIG. 1 is a diagram of the process and system of an illustrative embodiment of the invention.

The process of the invention, and the system and apparatus now deemed of special advantage for carrying it out, are illustrated in schematic form in FIG. 1, being an example adapted for refining naphthalene of coal tar origin, as for example crude naphthalene characterized by a solidification point of about 70° C., derived from the so-called light oil product of the treatment of coke oven gas. As will be understood most or all of the several elements of the system can be conventional items of equipment and are therefore illustrated by block diagram, the several pumps, valves and controlling instrumentalities being indicated in properly symbolic manner and all pipe, tubing or other conduit being likewise shown as simple lines. Connections for controlling devices and driving means are indicated by dashed or dot-and-dash lines as will be apparent.

Thus in FIG. 1 a supply of the crude naphthalene in melted form, e.g. at 190° F., is maintained, and replenished as necessary, in a tank 10 from which it is continuously advanced by a pump 11 to a mixing tank 12 where it is continuously mixed, by appropriate agitating means if necessary (not shown), with heated solvent (comprising methanol) to establish the desired solution of naphthalene and accompanying impurities. From the tank 12, the solution is continuously conveyed, under pressure, by a pump 13 to a continuously-operating scraped-shell crystallizer generally designated at 14, the solution being introduced into the recirculation line 15 for the crystallizer, advantageously downstream of the pump 16 which maintains continuous flow through this apparatus.

Coolant for the crystallizer can be ordinary water supplied from and returned to a main 18, the coolant flow of water being handled through a surge tank 19 and propelled by a pump 20.

From the crystallizer, and advantageously from a locality in the external recirculating line 15 downstream of the pump 16 and upstream of the inlet 21 for crude naphthalene solution, a continuous flow of naphthalene slurry is withdrawn through the line 22 to the filter 24, the action of the crystallizer being to deposit crystals of purified or refined naphthalene on the internal surface of the shell in each element of the series, and the shell being continuously scraped so that the flow withdrawn in the line 22 comprises a slurry of refined naphthalene crystals in the solvent, e.g. methanol, which retains impurities, and some dissolved naphthalene. Although other, preferably continuous apparatus can be used for separating the naphthalene crystals from the liquid, as for example a centrifugal separator, unusual advantage resides in employing a continuous rotating drum filter carrying a cylindrical filter screen 25 operated under substantial pressure at its outer side, whereby crystals from the supplied pool of slurry 27 are collected on the screen and removed by a doctor blade 28 so as to fall into a hopper 30 and be there melted into a pool 31 of the naphthalene, that unavoidably contains some residual methanol.

The melted naphthalene from the filter hopper 30 is advanced by a pump 32 to and through a dryer 34, which removes the accompanying methanol by flash distillation, the melted and refined naphthalene being then finally delivered by a pump 35, e.g. to a product tank 36.

Filtrate from the interior of the filter drum, containing the remainder of dissolved naphthalene together with an increased concentration of impurities, is received in the filtrate tank 38. From the latter, a recirculated flow of filtrate is advanced by the pump 39 in line 40 to constitute a portion of the solvent in the mixing tank 12, while the remainder of the continuous withdrawal of filtrate from the tank 38 is advanced by pump 41 in the line 42, for distillation to recover the solvent, i.e. methanol. This is accomplished in a still 44, conveniently identified as the pure still, leaving a melted residue or bottom fraction delivered by a pump 45 through a line 46. The recovered methanol, reestablished in liquid form by a condenser 48 receiving the vapor from the still 44, is conveyed by a pump 49 and a line 50 to an appropriately large storage tank 52 for pure methanol, the latter having an outlet pump 53 supplying pure methanol in a line 54 for ultimate mixture with recirculated filtrate from the line 40, to constitute the complete supply of solvent, via the line 55, to the mixing or solution tank 12.

Essential steps of the complete and entirely continuous process are therefore shown as explained heerinabove, including continuous production of crude naphthalene in methanol, continuous treatment to establish crystals of purified naphthalene, i.e. as a slurry in the methanol solution, the crystals being continuously separated by pressure filtration, melted, dried of methanol and ultimately delivered in continuous fashion as refined, liquid naphthalene. Coolant for the crystallizing operation is constituted by a water supply circulated through the jacketing of the crystallizer. For optimum efficiency, the filtrate is recirculated along with a suitable proportion of pure methanol, in the continuous establishment of crude naphthalene solution, while methanol is also continuously recovered, for reuse, from the remainder of the filtrate.

Returning to the preparation of the methanol solution in the tank 12, the melted naphthalene is metered into the tank, from the pump 11, by a valve 60 which is automatically adjusted to provide a predetermined ratio of naphthalene to solvent, such control being exerted by a suitable device 61 governed by the flow in the solvent supply line 55, e.g. in accordance with the setting of the control valve 62 in that line. The latter valve is in turn controlled by a level signal, as shown, from suitable level-responsive means in the mixing tank 12. Thus by primary adjustment of the solvent flow a supply of mixed solution is maintained in the tank 12 at an approximately constant level or between suitable levels, while the naphthalene is fed in an appropriate proportion to the solvent. Such proportion can be varied by adjusting the ratio control means 61 and is of course set to insure dissolution of all of the crude naphthalene which reaches the tank 12 and very preferably to attain a saturated or near-saturated solution at the selected temperature, as for example 135° F. This temperature is maintained by a suitable heater 65 in the solvent supply line, which may be heated by steam and which is regulated by appropriate temperature sensing means 66 in the tank 12 so that a substantially constant temperature is achieved.

As explained, the solvent for the tank 12 is preferably composed of recirculated filtrate, from the line 40, and pure methanol from the tank 52 and the line 54, the latter including a control valve 68 having an appropriate setting such as to accommodate a wide range of methanol demand as occasioned by the solvent control valve 62 and also such as to afford a reading, by its setting, to which the valve 70 in the filtrate supply line 40 may be adjusted for maintaining a selected ratio of filtrate to pure methanol. The last-mentioned control is effected by a suitably adjustable device 71 which is governed not only by the flow in the methanol line 54 but is also limited by a minimum level signal from the filtrate tank 38, as indicated at 72 and the line broken at $x$—$x$. That is to say, if the available filtrate approaches or reaches too low a level, the normally desired proportion of filtrate to pure methanol is reduced or even cut off( if necessary, by this over-riding control of the ratio adjustment 71, whereupon the demand of solvent by virtue of the setting of the valve 62, is automatically satisfied by increased flow of pure methanol via the line 54. When and as the filtrate level rises, ratio control is resumed at the desired value, it being understood that in normal operation there should be a generally sufficient supply of filtrate so that little or no over-riding change of the filtrate valve 70 is needed.

The setting of the proportion of filtrate to pure methanol affords an advantageous method of controlling the process operation to achieve a refined naphthalene product of precisely desired purity. Recirculation of filtrate serves a basic function of economy in reducing the amount of naphthalene which is lost by remaining in solution and by ultimate discharge in the bottoms of the pure still 44, e.g. at 46. On the other hand, the amount of filtrate recirculation feasible is limited by build-up of impurities with corresponding effect in reducing the selectivity of naphthalene. It is found, however, that the ratio of filtrate to pure naphthalene for supply as solvent to the mixing tank can be adjusted within a considerable range, to provide corresponding stabilization of the process, i.e. the solution to and slurry from the crystallizer, at a level of impurities in solution and corresponding level of purity of the refined naphthalene product, which is directly related to such ratio or proportion. In consequence the ratio control 71 may be set to achieve a refined naphthalene of desired purity, e.g. whether 77.5° s.p. or 77.7° s.p. or 78° s.p. or higher. The setting must be selected so that the circulating load of impurities is stabilized and is at a level which permits attainment of the predetermined grade of product purity. The yield of refined naphthalene is then efficiently maximum and there is no impairment of yield as might accompany the unnecessary production of refined naphthalene at a grade higher than required.

Delivery of the crude naphthalene solution, at selected concentration and elevated temperature, is set to achieve the desired production of refined naphthalene as obtainable within the capacity of the crystallizer and filter, and can be automatically controlled for uniformity of result, as explained below. For this purpose, the solution is delivered by the pump 13 into the line 21 at a selected pressure, governed by the valve 75, which is regulated by suitable pressure-sensing means at 76 in the line downstream of the valve, whereby a constant pressure is maintained in the line 21 and the rate of flow may vary automatically with demand.

Figure 2:
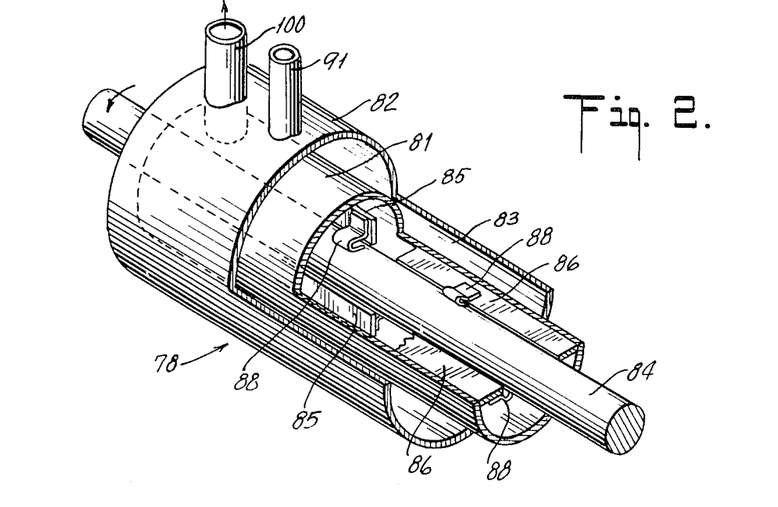
FIG. 2 is a greatly simplified perspective view, with portions cut or broken away, of a crystallizer suitable for the invention.

The basic refining step of the process consists in a selective recrystallization of naphthalene from the heated, crude naphthalene solution by cooling substantially below its saturation temperature, i.e. by repeatedly contacting the solution with a cooled surface from which the deposited crystals are continuously removed, advantageously into suspension in the liquid to constitute the latter as a slurry. While other apparatus or arrangements provided a chilling contact with the saturated solution may be used for establishing and slurrying or otherwise carrying away naphthalene crystals, highly effective continuous operation is afforded by a scraped shell crystallizer such as schematically illustrated in FIGS. 1 and 2. Such apparatus may comprise a set of series-connected, elongated cylindrical elements, of which three are illustrated at 78, 79 and 80 in FIG. 1, it being understood that the number, length and other dimensions and arrangements of these sections may be selected as appropriate for the design and capacity of the refining plant. Each unit consists of an internal shell 81 through which the solution or slurry continuously travels from end-to-end, and an outer casing 82 providing a jacket 83 through which the coolant water similarly travels, to cool the shell 81, very advantageously in countercurrent relation. Internally each unit has a central, axially extending shaft 84 which carries a suitable multiplicity of scraper elements as at 85, 86. These elements are very preferably arranged for positive scraping contact with the inside shell surface and may be, for example, blades of tough plastic composition mounted to the shaft 84 by stiffly resilient means, indicated in simplified manner by the spring band elements 88. Although other numbers and arrangements of scrapers can be used, the structure shown involves diametrical pairs of blades 85, 85 and 86, 86, in successive sets at 90° or like angles to each other along the shaft, i.e. for mechanical balance and stability. The function is that as the shaft 84 is continuously rotated by the motor 89, the entire inner surface of the shell 81 is repeatedly scraped to remove deposited crystals.

Coolant water from the line 90 enters the jacket 83 of the unit 78 through the inlet tube 91 and leaves through a pipe 92 at the opposite end, shown also as the coolant inlet for the jacket of the unit 79. From the latter the water travels through the tube 93 into the jacket of unit 80 and leaves at the tube 94 for return flow through the line 95. Crude naphthalene solution, which during operation after establishment of equilibrium is a slurry of naphthalene crystals, enters the interior of the shell of crystallizing unit 80 via the inlet 96, from the line 15, and leaves the unit at the opposite end through the pipe 97 which enters the shell of the unit 79, the slurry path from the latter extending through pipe 98 into the unit 78. The slurry flow leaves the latter unit via the tube 100 and circulates through the exterior line section 101 to the circulation pump 16, from which it returns via line 15 to the crystallizer bank. Although concurrent operation is conceivable in some cases, countercurrent flow of the solution or slurry and the coolant is notably advantageous in maintaining or tending to maintain an essentially constant difference of temperature between the two liquids throughout the entire paths of both in the crystallizer.

The temperature of the coolant water is sensed, advantageously continuously, as schematically indicated at 102, 103, 104 and 105, being respectively at the inlet of the unit 78, at the joint outlet of such unit and inlet of unit 79, correspondingly at the outlet of unit 79 and inlet of unit 80, and at the final outlet, i.e. of unit 80. One function of such temperature detection is in monitoring the operation, in that proper performance is accompanied by an expected temperature rise between the inlet and outlet of each of the crystallizer units. Thus for example if the temperature readings at 102 and 103 are compared and show no significant difference, malfunction of the unit is indicated, as for example in that the deposited crystalline layer may not be subject to proper removal by the scrapers. Identical indication is available for each of the other units 79 and 80, and indeed if desired, automatic registration of temperature difference may be provided for this monitoring function.

Supply of coolant water is withdrawn from the main 18 through a valve 107 into the surge tank 19 and is thence advanced for continuous circulation by the pump 20 into the line 90. Return in the line 95 extends through the valve 108 back to the main 18, e.g. at a downstream locality. A most convenient operation is to utilize water already available, i.e. municipal or other water supply as flowing through the line 18 to other use, e.g. the normally large use of water in cooling towers of the coke oven by-product plant. With a preferably high rate of flow maintained in the coolant circulation for the crystallizer, advantageously such as to afford substantial turbulence through the jackets 83, there is normally only a very small rise in temperature between the withdrawn and returned water stream (e.g. 3° to 5° F.) and correspondingly no significant impairment of the use of the water at other localities in the plant. A by-pass line 110 controlled by a valve 111 is provided so that during times of start-up or non-use or servicing of the naphthalene purification process, the water circulation can be initiated or interrupted, while valves 107 and 108 are closed completely and there is no need to shut off the principal flow in the line 18.

An important feature of the procedure is that in initiating operation, when solution from the tank 12 is first introduced into the shells of the crystallizer bank, and is set into circulation, filling the entire line, by the pump 16, the initial flow of coolant water from line 90 to line 95 should be at a temperature only slightly below that of the warm solution. This is conveniently accomplished by heating the water, having in mind that it will ultimately be utilized at its normal, supply temperature. Thereafter the temperature of the water is gradually allowed to fall, ultimately reaching such normal temperature. In this fashion, there is no sudden, undue build-up of crystals, as in the entering part of the shell of the unit 80, or at further localities, by reason of an otherwise larger temperature difference that in effect would shock-cool the solution. The latter occurrence could obstruct the proper function of the scraper blades, indeed possibly bending or breaking them, in that a heavy crystal layer becomes ice-hard. Moreover, heat transfer through a thick layer becomes badly inefficient, while the reduced diameter of the solution path unduly impairs its intended flow.

For control of the water temperature, a heater 112, for example heated by steam supplied under control of a valve 113, is included in the surge tank 19, and at the outset the valves 108 and 107 and the heater valve 113, indeed conveniently with some opening of the valve 111, are set so that the initial temperature of the supplied and recirculating water (at 94-105) is at most only a few degrees F. below that of the naphthalene solution, for example as sensed at 115 for the solution inlet locality 96. With the scrapers operating and the solution circulating at a rapid rate of flow, e.g. to provide turbulence for maximum heat transfer throughout the interior surfaces of the crystallizer shells, coolant and solution flows are continued until naphthalene crystals begin to appear in suspension in the solution. The temperature difference is then slowly raised, as by reducing the function of the heater at its valve 113 with appropriate adjustment of other valves as necessary, until a moderate differential is reached, e.g. of the order of 20° F. to 25° F. Thereafter such differential is maintained until a substantial content of naphthalene crystals is reached in the circulating solution, i.e. approaching the ultimately desired slurry concentration.

Maintenance of this interim temperature difference can, if desired, be automatically regulated by a sensing of difference between the slurry temperature reading at 115 and the water temperature reading at 105, functioning to adjust the valve 108. This effects a minor modification of the return flow and indeed correspondingly of the entire flow in the water circulating line, whereby the correspondingly longer or shorter residence time of water in the heated surge tank 19 occurs, for restoration of the desired temperature difference. Since the valve 107 is adjusted from a suitable level responsive means 117 to maintain a particular level in the surge tank, the flow of water into the system from the main 18 thus is adjusted as necessary to agree with the change in circulation controlled by the valve 108.

When the circulating solution reaches a sufficient content of suspended naphthalene crystals, the coolant water temperature is allowed to fall gradually to its normal or inherent value, i.e. as supplied in the main 18, and operation of the heater 112 can be entirely discontinued. Thereafter the flow of solution into and withdrawal of slurry from the circulation through the crystallizer 14 is advantageously controlled to maintain a selected temperature in the withdrawn slurry, for example as continuously measured at 120 in the circulation line 101, in effect immediately upstream of the slurry delivery pipe 22. As further explained below, such control establishes a desired equilibrium for continuous operation, to maintain a constant concentration of solids, i.e. naphthalene, in the product slurry.

Figure 3:
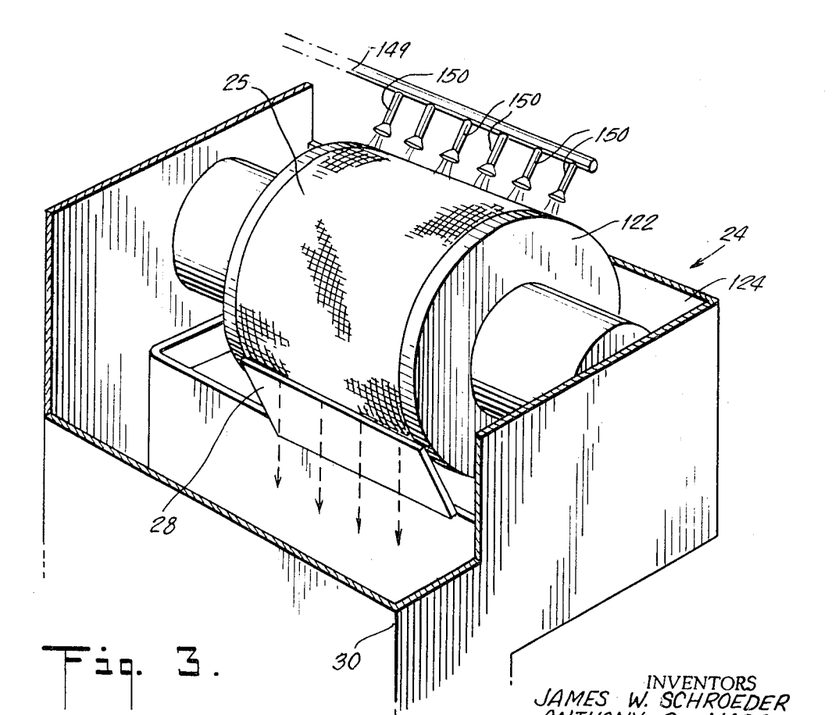
FIG. 3 is a simplified perspective view, with parts cut away or omitted, of a pressure drum filter adapted for use in the invention.

Referring to FIG. 3 as well as FIG. 1, the filter 24 embraces a drum assembly 122 continuously rotated by suitable driving means as indicated by the motor 123 and carrying the cylindrical filter screen 25 of appropriate fineness to retain the naphthalene crystals in conventional cake layer. The entire assembly is enclosed by a sealed housing 124 for maintenance of desired super-atmospheric pressure on the outer face of the screen 25, and provision is afforded to hold the pool of slurry 27 around the lower part of the rotating drum, such pool being fed by the slurry delivery pipe 22. Inasmuch as pressure drum filters of suitable character are known and available, structural details are omitted, it being here simply indicated in a diagrammatic manner that fluid communication through the filter screen 25 and past an inwardly spaced, supporting cylindrical shell 125 is afforded by appropriate passages 127 connecting through the trunnion of the drum to a collecting vessel or conduit schematically represented at 129, i.e. for delivery of filtrate 130 and also passage of such air or gas as is maintained under pressure in the upper part of the enclosure 124, i.e. to the extent that such gas flows, as necessary, through the screen.

Although air can be employed it is preferred to maintain an atmosphere of any suitable inert gas, such as nitrogen, in the chamber, such gas being continually supplied by a pump 132 through line 133 having a valve 134 adjusted to maintain a constant pressure in the chamber, e.g. as sensed at 135. As previously indicated, the pressure in the slurry line 22 is effectively established, at a regulated value, by the valve 75 in the solution supply line 21 to the crystallizer, such pressure being created by the force of the pump 13. The slurry circulating pump 16 thus maintains desired flow in the crystallizer and also the departing flow in the line 22, but as will be apparent, the primary pressure control is established in the line 21 and effectively appears in the liquid pool 27, diminished only by such relatively minor, constant drop as may not be wholly overcome by the pump 16.

It has been found desirable to subject the filtrate, e.g. at 130, to the function of a suitable liquid-gas separator as indicated at 137, such withdrawal of filtrate to the separator being through a valve 138 which may be controlled by pressure sensed in the filtrate leaving the filter, e.g. at 140, for thereby maintaining a selected pressure in the departing filtrate, and correspondingly a selected pressure difference across the liquid-handling portion of the filter screen. The separator 137, which may be of conventional, known type for insuring removal of gas from a liquid and like collection of liquid from gaseous feed, may also receive through an upper line 141 the primarily gaseous return from the upper, inner face of the filter screen. Gas-free filtrate is therefore delivered from the separator 137 by a pump 142 to the filtrate tank 38, while the gas, e.g. nitrogen, may be led from the upper end of the separator 137 through a condenser 144 and thence through the line 145 to be returned to the head of the filter by the pump 132. Makeup nitrogen can be supplied as necessary to the line 145 as indicated at 146. By appropriate cooling means in the condenser 144, any methanol vapor is condensed to liquid form and through the pump 147 is returned into the pure methanol line 50, for ultimate addition to the supply of methanol in the tank 52.

As will be understood, the actual structure of the filter 24 may be such as to provide different pressure conditions or differences of pressure across those parts of the filter screen which are exposed to gas and across those parts which are exposed to liquid as at 27, such arrangements including automatic valving means as known and therefore not shown. Filters of this type, as stated, are well known and provide convenient and efficient operation, but for simplicity of illustration the system is shown as if maintaining identical pressure conditions across all parts of the filter. In the preferred known filter arrangement, however, the pressure drop across the gaseous portion of the filter screen path is adjusted by the valve 134 and the drop across the liquid-encased portion of the path is independently adjusted by the valve 138.

To special advantage, the cake of purified naphthalene crystals built up on the revolving filter screen as it traverses the pool 27 and rises above the latter is subjected to a moderate wash of pure methanol spray pumped from the tank 52 through the line 149 and delivered through a multiplicity of spray nozzles 150 arranged in an array across the drum, i.e. parallel to the axis of the latter. Very preferably, this pure methanol spray is essentially controlled so as to be no more than a displacement of the residual solvent liquor (used solution) in the filter cake, rather than a substantial wash of the crystals, it being found sufficient simply to substitute pure methanol for the entrained solution, which apparently persists in only about the lower half of the thickness of the cake. Both the solvent liquor and the replacing methanol are subject to continuing influence of the gaseous pressure difference so that no more than a minimum of the pure methanol remains as the cylindrical screen travels on to the locality of the doctor blade or scraper 28, which is conveniently disposed below the level of the drum axis.

The effectiveness of the impurity-displacing wash has been found to decrease with increase of cake thickness at or beyond one inch, indeed to the extent that above this value the minimum removal of impurities with a minimum wash flow is even impaired by greater quantities of wash methanol, apparently because at this larger thickness of crystal layer, the methanol flow channels increasingly while the thicker cake retains a larger quantity of impure solution. Accordingly the filter drum, within the limit of providing an adherent cake of filtered-out crystals on the screen, is turned at a sufficiently high speed of rotation to limit the cake thickness, advantageously to less than one inch, e.g. three-fourths inch or less, and very preferably to about one-half inch.

The crystals removed from the drum by the doctor blade 28 fall into the hopper 30 where they are melted by a heater 152, which may be steam coils, and form the pool of melted naphthalene 31. This operation affords an effective seal for the pressurized filter housing 124, permitting continuous withdrawal of naphthalene, e.g. by the pump 32 through the line 153. Although other enclosed liquid-handling arrangements, such as a simple trap, can be employed (for maintenance of the superatmospheric pressure in the filter), the system of the pump 32 and a valve 154 in the delivery line 153, controlled from level sensing means 155 in the hopper 30 so as to maintain a suitable level of melted naphthalene, is very effective. Maintenance of the naphthalene in uniform melted condition is aided by controlled recirculation of the liquid through a valved by-pass line 156.

A further special feature of the naphthalene recovery operation in the filter is the disposition of the blade or scraper 28 at an oblique angle or slope, i.e. so that its surface which is outward of the drum faces downwardly. With the blade thus disposed at an acute angle, e.g. 10° or more, to the vertical, crystals or cake removed from the screen fall clear of the blade, directly into the hopper 30, it being found that with normal scraper arrangements, having a down-sloping surface that faces upwardly, the effect of adjacent heat tends to melt the naphthalene and cause it to stick on the blade, interfering with the desired continuous removal of crystals. Effective displacement of the cake is achieved with reasonably close disposition of the scraping edge, e.g. preferably about one-eighth inch from the screen surface.

The continuous flow of slurry from the crystallizer circuit to the filter is adjusted, by a valve 160 in the line 22, under control of the slurry temperature as sensed at 120. That is to say, having determined an optimum temperature to which the circulating crude solution should be brought and kept for maximum yield, the withdrawal of slurry through the line 22 is varied so as to maintain this temperature in the circulating slurry as the latter leaves the end of the crystallizer bank. If the detected temperature falls, indicating excessive residence in the crystallizer, valve 160 is moved to a more open position, thus increasing the withdrawn flow of slurry and necessarily also increasing the supply of solution in the line 21, the flow in the latter being correspondingly responsive by reason of pressure-maintaining adjustment of the valve 75. In consequence a greater flow of solution in and slurry out occurs, reducing the residence time in the crystallizer bank and allowing the temperature at 120 to rise to its intended value. If this temperature, however, exceeds such value, the valve 160 is correspondingly moved toward closed position, with reduced flow of solution and slurry and a longer circulation time so as to reduce the temperature at 120. Inasmuch as the operation is such that the solids content, i.e. the weight percent of naphthalene crystals in the slurry, is governed directly by the slurry temperature, when other factors are kept constant, the stated temperature control is effective to maintain a constant solids content of the slurry reaching the filter, with the desired consequence of uniformity in continuous filter operation.

Since the melted naphthalene in the pool 31 unavoidably retains a content of methanol, being preferably pure methanol as resulting from the displacement sprays 150, the line 153 conducts the melted naphthalene to a dryer 34, conveniently a simple still, where the methanol is evaporated off, e.g. by what is essentially flash distillation. For uniformity of operation, the melted naphthalene is circulated through a tank 162 that may include a steam-energized or other suitable heater 163 and thence by the pump 132 back to the base of the dryer 34 through the line 164, the pump 35 also serving to advance the dried and purified naphthalene, in melted state, to the product tank 36.

Methanol vapor leaving the top of the dryer 34 advances through a line 166 to a condenser 167, having suitable cooling means, and the resulting liquid methanol is thence propelled by a pump 168 to the methanol tank 52.

As explained above, the filtrate or used solvent liquor accumulated in the tank 38 is in part recirculated to the mixing tank 12 via line 40 and the ratio-controlled valve 70. The balance of the filtrate, delivered by the pump 41 and line 42 to the pure still 44 is there distilled for recovery of pure methanol, i.e. from the appropriately cooled condenser 48 to which vapor from the top of the still is directed by the line 170. The residue or bottom fraction from the pure still 44 is accumulated in a lower tank 172 and thence delivered into a line 46 by the pump 45. For maintenance of evaporating temperature in the still, the tank 172 may cooperate as boiler or kettle, with a heater 173, e.g. supplied with steam, and an appropriate recirculating by-pass line 174 from the pump 45, to maintain the desired uniformly high temperature in the vesel 172. Thus if the combination of incoming temperature of the filtrate and any suction as developed by the condenser 48 and pump 49 are inadequate for the desired completeness of distillation, the vessel 172, with appropriate connection to the bottom of the still, may coact in the distilling operation.

As indicated, this recovery of methanol may be essentially a flash function, especially when the methanol and the entire plant circuit is kept free of water or essentially so. However, if significant rectifying action is required, even for distillation where the filtrate is water-free the boiling function of the tank 172 is not only available, but reflux may also be achieved with a by-pass line 175 between the outlet of the condensed methanol delivery pump 49 and the head of the column 44, the reflux ratio being controlled by suitable adjustments of the valves 176 and 177, respectively in the lines 175 and 50. The melted residue delivered at 46 consists essentially of the impurities separated from the refined naphthalene product, together with a remainder of naphthalene, ordinarily a very minor fraction of the naphthalene contained in the crude material from the supply 10. This residue can conceivably be subjected to other plant treatment for separation of crude naphthalene, or it may be simply added to tar or like fractions of lower grade among the coke plant products.

The total operation of the process is essentially as has now been described, and is entirely continuous from the supply of crude naphthalene to the delivery of the refined product, including recovery of pure methanol, all in a completely closed system with maximum economy of agents utilized, including almost 100% recovery of methanol, it being only occasionally necessary to add make-up to the methanol tank 52.

Details of operation may conveniently be summarized with an example of specific operating conditions, as follows:

Crude naphthalene, derived from a distillation residue of the so-called intermediate light oil in a coke gas plant, is established in melted form in the tank 10, e.g. at 190° F., the use of melted naphthalene being advantageous in that it facilitates temperature control of the solution in tank 12 and likewise facilitates metering the material thereto. In one instance, such naphthalene had a purity represented by 73° C. s.p. and analyzed 88.0% naphthalene. In the mixing tank 12 the solvent is supplied, for instance heated by the heater 65 so that the mixed solution is produced at a temperature of about 135° F. Conveniently this temperature should be slightly above the temperature at which the feed of crude naphthalene, as proportioned to the feed of solvent, forms a saturated solution; such proportion is determined for saturation at a temperature that is selected for suitable temperature reduction in the recrystallizing stage, having in mind the temperature of cooling water currently available.

The proportion of filtrate to pure methanol in the solvent supply line 55, as determined by the ratio control 71–70 is adjusted to obtain the desired degree of purity in the ultimate refined naphthalene, such adjustment being readily determined by test in setting up operation of the system, and likewise as neccessary from time to time during continuous running, thus taking cognizance of any changes in grade of the crude naphthalene as may occur. For instance, in operation with the above-mentioned 73° C. s.p. crude supply and producing a refined naphthalene at 78.0° C. s.p., a volume ratio of 50% recirculated filtrate and 50% pure methanol, or thereabouts, appears suitable.

The prepared solution of crude naphthalene is supplied to the crystallizer and with the entire bank of units filled, circulation is initiated by the pump 16. Circulation of the cooling water from the main 18, but adjusted in temperature by the heater 112, is then commenced, it being important that at the very start the water have a temperature only a few degrees below the temperature of the naphthalene solution, or more strictly, only slightly, e.g. 1° or 2° F., below the saturation temperature. With the scrapers operating, the temperature of the water is allowed to fall (having in mind that its inherent supplied temperature, in the pipe 18, is a determined value in a range usually below 75° F.) at a slow rate, as crystals begin to appear in the circulating naphthalene solution. For an interim period the water temperature is then maintained at such value that the temperature difference between the returning circulated slurry at 96 and the supplied water at 95 is not greater than about 20° F. to 25° F. It will be understood that at this and the later full-running stage the temperature difference between the slurry and the cooling water is approximately the same in the preferred mode of operation, there being only a few degrees, e.g. 5° F., rise of water temperature and decrease of slurry temperature between the ends of their respective paths in the crystallizer. When a significant content of crystals appears in the circulating slurry, e.g. as may be noted through an appropriate observation window or by withdrawal of a sample, the coolant water temperature is allowed to fall slowly to its normal inherent value. The withdrawal of slurry to the filter 24 having been initiated and the latter set in operation with functioning of all elements and features thereof, the several controls, including the setting of slurry withdrawal valve 160, are brought into play to stabilize the temperature in the circulating slurry, e.g. the process temperature at 120, at a selected, intended value for the desired results. A convenient example involves a 20% solids content in the withdrawn slurry, i.e. 20 parts by weight of naphthalene crystals to 80 parts of methanol; this, of course, may vary as conditions demand, a preferred range being from 10% to 30% solids.

As will be appreciated, the process temperature to be maintained as sensed at 120 and thus in the filter, is preferably selected for optimum efficiency, with regard to the actual temperature of the available coolant water. The latter can vary by as much as 35° F., or even more, depending on the season of the year. At a lower process temperature, i.e. filtration temperature, the yield of pure naphthalene theoretically rises, but the closer the selected temperature to the temperature of the water, the slower the rate of heat removal in the crystallizer, with consequent diminution of the production rate of refined naphthalene. Simple test and calculation can determine appropriate values of process temperature in various cases, with correspondingly appropriate selection of crude naphthalene concentration in the solution, i.e. thus selecting the saturation temperature. For instance, at 90° F., about 0.2 part by weight of crude naphthalene per part of methanol constitutes a saturated solution, the ratio being about 0.25:1 at 100° F., 0.4:1 at about 115° F., 0.63:1 at 125° F. and about 0.8:1 at 130° F.

By way of example, it appears that with the coolant water at 45° F., effective operating conditions are a dissolved content of crude naphthalene in the supplied solution which provides saturation at 125° F., and operation of the process at a filtering or process temperature (read at 120) of about 98° F. When the coolant water is at 70° F., as in the summer, the crude naphthalene concentration may correspond to a saturated solution at 130° F. and the process is conveniently operated at a slurry temperature of about 108° F. In each instance, as stated above, the operation affords a solids content of about 20% (based on pure naphthalene) in the slurry feed to the filter.

Under conditions of this sort, the recirculation through the crystallizer is in effect many times the rate of slurry tap off. The rate of flow in the circulating solution should be at least several times that of the withdrawn slurry, preferably at least ten times, and with special advantage at a value of about twenty times, the latter being the operating condition contemplated in the particular instances of coolant and process temperature noted above. Ordinarily it appears unnecessary to provide a higher ratio of circulation flow to withdrawn slurry flow, than the stated optimum value, or, say, thirty times at most. The average residence time of solution or slurry in the crystallizer depends on conditions, including the length of path in such apparatus, but may be conveniently short in most cases, as for example from twenty minutes in one embodiment, or less, to not more than about two hours.

It is highly desirable that the rate of flow of both water and process solution, as governed by the pumps 20 and 16, be such as to provide substantial turbulence in each liquid, the effective heat transfer into and out of the crystallizer shell being considerably increased under such circumstances. As will be appreciated, maintenance of turbulence is readily determinable by calculation with regard to the rate of flow and the cross-section of the flow path, e.g. to provide an adequately high Reynolds number, preferably well above the usual minimum for turbulence (about $10^4$), as for instance values in the range of $5 \times 10^4$ to $10^5$.

The scrapers are operated at a rapid speed, i.e. a rapid repetition of scraping so as to minimize the thickness of deposited crystal layer on the crystallizer shell at any time. The heat transfer coefficient through crystalline naphthalene is relatively poor, an increase of crystal layer by as little as 1/32 inch having a substantial effect. With oppositely disposed pairs of scrapers on a rotating shaft (see FIG. 2), a speed of at least about 20 r.p.m., and advantageously of 30 to 35 r.p.m. is desirable, or higher as up to 40 r.p.m., within limits of mechanical convenience. For good operation the crystal layer should not be allowed to grow above a thickness of about one-fourth inch and most advantageously should be kept well below, e.g. not more than about one-eighth inch.

As one example of a pilot plant operation of the process, the water coolant flow was 75 gallons per minute, the recirculating process flow of naphthalene slurry was 200 gallons per minute, and about 10 gallons per minute of 20% solids slurry was withdrawn.

While the pressure in the filter can be at any convenient, preferably super-atmospheric value, as measured in pounds per square inch (gauge) and thus in a range from 20 p.s.i.g. to 50 p.s.i.g., a convenient example of operation is at 30 to 35 p.s.i.g., as established by the pump 13 and maintained by the control of valve 75, and likewise as set by the pressure control at 134 for the supply of gas to the upper part of the filter. As explained, the filter drum is conveniently rotated to limit the thickness of filter cake, say to not more than about one-half inch, while displacement wash of naphthalene is supplied as a modest spray at the elements 150, e.g. in a quantity only sufficient to displace the entrained used liquor in the cake. Collected crystals are continuously received and melted in the vessel 30, as at a suitable temperature upwards of 180° F. and the refined naphthalene is conveniently discharged as at 36 in corresponding melted state. Inasmuch as methanol boils at 64° C. (147° F.) under atmospheric pressure, the dryer 34, involving effective reduction to such pressure, or possibly lower if desired, effects flash distillation of the entrained methanol; supplemental heat for vaporization is available, if needed, from the heater 163. Essentially the same situation of flash distillation may prevail in the pure still 44, for recovery of pure methanol from filtrate, suitable temperature of the filtrate being maintained or reached by coaction of the heater 173.

It is found that under presently preferred operation, the pure naphthalene crystals occurring in the slurry feed to the filter have a size substantially all passing 65 mesh and substantially all larger than 200 mesh, which is a convenient range for handling in slurry and for filtration. Thus the screen 25 constituting the filtering medium of the drum may be a 200 mesh stainless steel screen.

As a specific example of pilot plant operation with a crude naphthalene feed at 73° C. s.p. and a product at 79.4° C. s.p., chromatographic analysis revealed the following chemical composition of the feed and product:

| Compound | Composition, wt. percent | |
|---|---|---|
| | Feed | Product |
| Naphthalene | 88.0 | 98.7 |
| Benzothiophene | 2.2 | 0.8 |
| 1-methyl naphthalene | 0.6 | Trace |
| 2-methyl naphthalene | 1.8 | 0.1 |
| Phenol | 0.3 | |
| Other impurities | 7.1 | 0.4 |

In addition to the specific impurities mentioned above, which are important and difficult to remove, others commonly found in significant amounts in coal tar naphthalene (occurrence and proportion depending somewhat on the stage of naphthalene separation) include the following: acenaphthene, acetophenone, benzonitrile, biphenyl, coumarone, cumene, indan, indene, indole, Tetralin and o-tolunitrile. In crude coal tar naphthalene, the majority of the impurities are usually of this group (which includes those named in the table above), and commonly comprise at least several members of the group.

It will be seen that the process is unusually effective and avoids difficulties such as would be encountered in a distillation operation because of the fact that a number of these impurity substances, including the first three mentioned in the above table, form azeotropic mixtures with naphthalene. It has also been explained that the process is most effectively performed with essentially total exclusion of water, an upper limit for the latter being about 1% (by volume) relative to methanol. Whereas procedure of the described type may in some cases be used with a water-containing process liquid, special care is then required for the alcohol recovery, as in the pure still, and a considerably more complicated fractionating or rectifying process is involved, e.g. with upwards of 20 theoretical plates. Even though the water forms no azeotrope with methanol, it does with naphthalene and a number of the impurities, and the requirement then is to separate methanol (boiling point 64° C.) from such mixtures, having boiling points in the vicinity of 100° C. (governed by water), as distinguished from water-free operation where the separation is with respect to naphthalene and other substances at their inherent, much higher boiling points.

The crude naphthalene used in the above example was mentioned as being derived from the light oil treatment in a coke by-product plant, such naphthalene being specifically derived from the intermediate light oil. Other naphthalene sources in a conventional plant are also available as noted, one being from the so-called water final coolers where the main flow of gas from the so-called saturator, is subjected to cooling water that removes a substantial proportion of naphthalene, tar and other materials. Usually this naphthalene, with heavy tar components, is condensed as crude crystals, collected in a sump operation and boiled to remove the water. For use in the present process, it is found that superior results are attained if some of the pitch content is eliminated or avoided. For example, it has been discovered that if the crude crystals, before being dried of water, are contacted with intermediate light oil, and the majority of the water is removed by phase separation, the resultant naphthalene-enriched intermediate light oil (with which the water was substantially immiscible) can then be distilled, carrying off the remaining water and then carrying off the light oil fraction, leaving a resultant bottom fraction of crude naphthalene that can be distilled and is ideally suited for refining by the present process. Thus for example, following these steps and then so refining, the ultimately purified naphthalene originally derived from the water-process stage has achived a purity of at least 79.5° C. s.p., being more than 99% naphthalene and containing less than 0.01% non-volatile residue.

A considerable amount of naphthalene is removed in the tar of a coke gas plant, i.e. at an early stage in the sequence of the plant, and various procedures have been proposed for recovering it. Thus for example, the tar is subjected to a distilling operation that carries off naphthalene, with so-called carbolic oil and other oils, i.e. in an overhead fraction. Various materials, including tar acids, may be removed as by appropriate washing and then the crude naphthalene can be directly crystallized, by cooling to a very large temperature drop in a stirred crystallizer, being thereafter separated by centrifuging, yielding a crude naphthalene product. Such product can be refined in the process of the present invention, indeed according to present understanding with markedly greater effectiveness or efficiency than by other procedures such as fractional distillations.

The advantages of the present invention have been outlined hereinabove, but it may be additionally noted in reference to the presently preferred mode of operation, that there is an essentially closed system throughout, including arrangements for introduction of melted crude naphthalene and withdrawal of both the melted refined product and the non-returnable residue in such fashion as to keep the system sealed. Indeed the pure methanol storage tank 52 can be sufficiently large so that make-up of methanol is very infrequently needed. Thus there is a minimum opportunity for losses or for access of contaminants, even moisture or air, to the various circulating or traveling fluids and the entire process sequence, including the methanol solvent, supply of crude naphthalene, the naphthalene solution, the circulated and filtered slurry, and the filtrate and product are kept substantially dry, i.e. free of water.

The operation is continuous in all steps, including the crystallizing stage, where the scrapers 85, 86, on each pass remove substantially all crystals from the internal surface; although redeposit commences immediately after blade passage, the crystal layer is kept from becoming too thick. The flows of solution to and slurry from the crystallizer circuit are in effect adjusted equally, by the valve 160, to maintain the selected process temperature and slurry solids content. Commercially available apparatus can generally be used or adapted for the system, in appropriate size; for example in the pilot operation mentioned above, affording slurry output of 10 g.p.m., the crystallizer was a unit having a shell of about 12 inches innermost diameter with a scraped area of about 29 square feet.

The process can accommodate any normal range of coolant water temperatures, for instance up to 75° F., and as explained the naphthalene concentration of the crude solution is chosen to represent saturation at a temperature selected (e.g. in a range from about 120° F. upward) for good yield in relation to the actual coolant water temperature. Conveniently the crude solution is made and supplied at a temperature at least a few degrees F. above the selected saturation point. The conditions to be reached and maintained at equilibrium in the crystallizer after the special start-up procedure include the process or circulation temperature, which is represented by the reading of the instrument 120, and which is readily selected in coaction with the saturation temperature of the crude solution (desired values for the saturation of the solution and the process temperature being in effect chosen together, as indicated by examples above) for the desired results. In general, the crude solution should be supplied at a temperature quite substantially higher than that of the coolant water and with sufficient content of dissolved naphthalene so that in crystallizer operation involving cooling to the process temperature, which is intermediate the solution and coolant temperatures, the desired predetermined content of naphthalene crystals is constituted as slurry. The process temperature is advantageously selected to be substantially below the saturation point of the crude solution, e.g. by at least about 20° F., and likewise sulbstantially higher than the supplied coolant water temperature, e.g. by at least about 25° F. The entire system is unusually economical and efficient, affording a desirably high yield of refined product.

It is to be understood that the invention is not limited to the specific operations and structures herein described, but may be carried out in other ways without departure from its spirit.

What is claimed is:

1. A method of purifying naphthalene comprising mixing crude naphthalene with a solvent in which the solubiilty of naphthalene is temperature-dependent to establish a continuing supply of crude naphthalene solution, circulating said solution repeatedly through a crystallizing zone while cooling a surface of said zone to cause deposit of crystals of purified naphthalene and while scraping said surface to remove said crystals for constituting said solution as a slurry thereof, continuously withdrawing slurry from said crystallizing zone at a selected rate of flow while maintaining said repeated circulation through the crystallizing zone at a rate of flow equal to at least several times said selected rate of flow, for prolonged heat transfer between said solution and said surface, and separating said purified naphthalene from said withdrawn flow of slurry to yield purified naphthalene product.

2. A method as defined in claim 1, in which the solvent is methanol.

3. A method as defined in claim 1, in which said scraping is effected in sufficiently rapid repetition to prevent creation of a layer of crystal deposit more than about one-fourth inch thick at any time.

4. A method as defined in claim 1, in which the rate of flow of the solution circulating through the crystallizing zone is equal to at least about ten times the aforesaid selected rate of flow of withdrawn slurry and affords sufficient velocity along said surface to provide turbulence of the flowing solution.

5. A method as defined in claim 4, in which the solvent is methanol, and which includes detecting the temperature of the circulating solution and causing restoration of said temperature to a predetermined value from which it nas departed upward or downward, by respectively decreasing or increasing the rate of flow of withdrawing slurry and equally decreasing or increasing the rate of flow of naphthalene solution from the supply thereof to the circulating flow, thereby to increase or decrease the residence time of solution in circulation along said surface.

6. A method as defined in claim 1, in which the solvent is methanol, said solution and slurry being maintained substantially free of water, and said solution-circulating and surface-cooling steps being respectively sufficiently repeated and extensive to provide a crystal content in said slurry of at least about 10% by weight.

7. A method as defined in claim 1, in which the solvent is methanol and in which the rate of flow of the solution circulating through the crystallizing zone is equal to at least about ten times the aforesaid selected rate of flow of withdrawn slurry and affords sufficient velocity along said surface to provide turbulence of the flowing solution, said scraping being effected with rapidly repeated scraping passes each effective to remove substantially all crystals from said surface in passing.

8. A method as defined in claim 1, in which the cooling of said surface comprises flowing coolant water along the opposite face of structure forming the aforesaid surface, at a rate of flow affording sufficient velocity to provide turbulence in said water along said face.

9. A method as defined in claim 1, which includes detecting the temperature of the circulating solution and causing restoration of said temperature to a predetermined value from which it has departed upward or downward, by respectively decreasing or increasing the rate of flow of withdrawing slurry and equally decreasing or increasing the rate of flow of naphthalene solution from the supply thereof to the circulating flow, thereby to increase or decrease the residence time of solution in circulation along said surface.

10. A method as defined in claim 1, in which the cooling of said surface comprises flowing coolant fluid at a given temperature along the opposite face of structure forming the aforesaid surface, said crude naphthalene solution being supplied at a substantially higher temperature and with sufficient content of dissolved naphthalene so that upon cooling said solution, in said crystal-depositing circulation, to a predetermined temperature which is intermediate the aforesaid given and higher temperatures and is substantially lower than the temperature at which said naphthalene content represents a saturated solution, a predetermined content of naphthalene crystals is constituted as slurry therein; and which includes maintaining said content of naphthalene crystals in the aforesaid withdrawn slurry by adjusting the rate of flow of said withdrawing slurry and the rate of flow of said crude naphthalene solution to the circulating flow, to maintain said predetermined temperature in said circulating flow.

11. A method as defined in claim 10, in which the solvent is methanol and in which said coolant fluid is water supplied at a given temperature in a range up to about 75° F., said crude naphthalene solution being supplied at a temperature of at least about 120° F. and being saturated at a temperature of at least about 120° F., and said predetermined temperature being at least about 25° F. higher than said given temperature and at least about 20° F. lower than said saturation temperature.

12. A method as defined in claim 1, in which the solvent is methanol and in which the cooling of said surface comprises flowing water, supplied at a given temperature in a range up to about 75° F., along the opposite face of structure forming the aforesaid surface in a direction countercurrent to the direction of the circulating flow of said solution, said crude naphthalene solution being supplied at a temperature of at least about 120° F. and having a dissolved naphthalene content which constitutes saturation at a temperature of at least about 120° F., and said circulating flow being controlled so that it is maintained at a predetermined temperature, by the cooling action of said water flow, which is at least about 25° F. higher than the given temperature of the water and at least about 20° F. lower than said saturation temperature.

13. A method as defined in claim 1: in which performance of said method in continuing operation comprises supplying the crude naphthalene solution at a predetermined elevated temperature, effecting said surface cooling by flow of coolant fluid at a given, substantially lower temperature, said circulating, slurry-forming solution being brought by said cooling to and maintained at a predetermined operating temperature which is intermediate said elevated and lower temperatures and is substantially below the temperature at which the naphthalene content of the supplied solution represents a saturated solution; and in which said continuing operation is initiated by supplying and initiating said circulation of said crude solution at said elevated temperature, while initiating said flow of coolant at a temperature which is higher than said given temperature and is slightly below the said saturation temperature, for only gradually initiating said deposit of crystals along said surface, and thereafter gradually reducing the temperature of said coolant flow to provide build-up of said deposit of crystals substantially uniformly along said surface, said coolant flow being thereby ultimately reduced in temperature to the aforesaid given temperature for said continuing operation of said method with maintenance of said predetermined operating temperature and continuous withdrawal of slurry from said operating zone.

14. A method as defined in claim 13, in which the solvent is methanol and in which said coolant fluid is water supplied at a given temperature in the range up to about 75° F., and said saturated solution temperature is at least about 120° F., for the crude naphthalene solution is at least about 120° F., said initiation of coolant flow including heating said supplied water to a temperature slightly below said saturation solution temperature, and said reduction of coolant flow temperature comprising gradually reducing and ultimately ceasing said heating of the water.

15. A method as defined in claim 1, which includes advancing said crude naphthalene solution to said crystallizing zone under pressure and circulating said solution by propelling same under the aforesaid pressure, through said zone, said separation of purified naphthalene from said withdrawn flow of slurry comprising advancing said slurry flow to and through a filter element under the pressure established in the first-mentioned advancing step to effect separation of said naphthalene by filtration under super-atmospheric pressure.

16. A method as defined in claim 1, in which the separation of said purified naphthalene from said withdrawn flow of slurry comprises continuously filtering said last-mentioned slurry by forcing the same through a continuously moving filter element at one locality of travel of said element and separating the crystals of naphthalene from the surface of said element at another locality of its travel, and subjecting the crystals on said element at a locality between the aforesaid localities to a flow of pure methanol to replace filtrate entrained by said crystals with pure methanol, while withdrawing the replaced filtrate through the filter element.

17. A method as defined in claim 16, which includes controlling said filtering step to limit the layer of naphtalene crystals on said filter element, which is subjected to said filtrate-replacing flow of methanol, to a thickness not greater than about one inch.

18. A method as defined in claim 1, in which the solvent is methanol and in which the separation of purified naphthalene from the withdrawn flow comprises continuously filtering said slurry by forcing the same through a filter element having extended surface under positive super-atmospheric pressure relative to the opposite side of said element, so that said crystals are collected on the surface of said element, continuously removing said crystals from the element surface to a receiving zone while supplying heat to convert the crystallized naphthalene to melted form, and removing said melted naphthalene to a discharge region through a passage enclosed to maintain the aforesaid superatmospheric pressure at the filter element.

19. A method of purifying naphthalene comprising establishing a solution of impure naphthalene in a solvent in which the solubility of naphthalene is temperature-dependent, circulating said solution through a crystallizing zone while removing heat for deposition of crystals of naphthalene and constituting said solution as a slurry of said crystals, continuously filtering said slurry by forcing the same through a filter element having extended surface under super-atmospheric pressure relative to the opposite side of said element, so that said crystals are collected on the surface of said element, continuously removing said crystals from the element surface to a receiving zone while supplying heat to convert the crystallized naphthalene to melted form, and removing said melted naphthalene to a discharge region through a passage enclosed to maintain the aforesaid super-atmospheric pressure at the filter element.

20. A method of purifying naphthalene comprising establishing a solution of impure naphthalene in a solvent in which the solubility of naphthalene is temperature-dependent, removing heat from said solution for deposition of crystals of naphthalene to constitute said solution as a slurry of said crystals, continuously filtering said slurry by forcing the same through a filter element under pressure drop across said element while maintaining said filter element in an enclosed region, continuously removing filtered crystals from the surface of said element to a receiving zone, maintained in enclosed communication with said region, while supplying heat to convert the crystals to melted form and flowing said melted naphthalene from said receiving zone while maintaining the enclosure of said region.

21. A method as defined in claim 20, in which said removal of crystals from the element surface comprises scraping the crystals therefrom while permitting them to fall free into said receiving zone directly from said surface.

22. A method as defined in claim 21, in which the solvent is methanol and in which the aforesaid pressure difference is maintained by maintaining super-atmospheric pressure on the side of said filter element upon which said crystals are collected, said flow of melted naphthalene from said zone being effected to maintain the enclosure of said filter element sealed against impairment of said super-atmospheric pressure.

23. A method as defined in claim 22, in which maintenance of said pressure includes supplying inert gas under controlled pressure into said filtering region around the locality of removal of said crystals, and which includes withdrawing filtrate and gas from the opposite side of said filtering element, and continuously separating and withdrawing filtrate while recirculating gas to the aforesaid region.

24. A method as defined in claim 23, in which said gas recirculation includes subjecting the gas to cooling and thereby condensing and removing vaporized methanol from the gas.

25. A method as defined in claim 20, in which the solvent is methanol and which includes the step, prior to said removal of crystals from the surface of the filter element, of directing a flow of pure methanol to said crystals on the element to replace entrained filtrate with pure methanol.

26. A method as defined in claim 20, in which said heat removing step comprises advancing said impure naphthalene solution to a crystallizing zone under pressure and circulating said solution through said zone under said pressure while effecting said removal of heat therefrom, said method including continuously withdrawing slurry from said crystallizing zone and effecting said filtering by force of said pressure established in said solution in the aforementioned advancing step, whereby said slurry is filtered under super-atmospheric pressure.

27. A method of purifying naphthalene comprising mixing crude naphthalene with methanol to establish a continuing supply of naphthalene solution, circulating said methanol solution of crude naphthalene repeatedly through an elongated crystallizing zone while cooling a surface of said zone to cause deposit of crystals of purified naphthalene, continuously scraping said surface to remove said crystals for constituting said solution as a slurry thereof, continuously supplying said slurry to an enclosed filtering zone while removing crystals by continuous filtration under super-atmospheric pressure, collecting the separated crystals and melting the same in said enclosed filtering zone to establish a continuing supply of melted purified naphthalene, withdrawing and drying said melted naphthalene to recover methanol therefrom and deliver purified naphthalene as a product, removing filtrate from said filter zone, continuously recirculating a portion of said filtrate to the aforesaid initial mixing step to constitute a part of the methanol supplied thereto, continuously subjecting the remaining portion of said filtrate to distillation for recovering pure methanol therefrom and establishing a continued supply of pure methanol replenished from said drying step and said distilling step, and delivering pure methanol from said methanol supply as the further part of methanol supplied to said initial mixing step.

28. A method as defined in claim 27, which includes detecting the temperature of the slurry being circulated through the crystallizing zone, and adjusting the quantity of slurry withdrawn as a flow to the filtering zone in accordance with the detected temperature so as to provide an increase or decrease of flow of withdrawn slurry as the detected temperature departs respectively below or above a predetermined value, while maintaining a constant pressure of feed of crude naphthalene solution from the mixing step to the crystallizing zone whereby the flow of solution from the mixing zone to the crystallizing zone increases or decreases with said withdrawn flow to decrease or increase respectively the circulating time of solution in the crystallizing zone, for maintaining the aforesaid temperature at the predetermined value and for maintaining a substantially constant content of naphthalene crystals in the withdrawn slurry.

29. A method of purifying naphthalene comprising mixing crude naphthalene with a solvent in which the solubility of naphthalene is temperature-dependent to establish a continuing supply of crude naphthalene solution, circulating said solution repeatedly through a crystallizing zone while cooling a surface of said zone to cause deposit of crystals of purified naphthalene and while scraping said surface to remove said crystals for constituting said solution as a slurry thereof, continuously withdrawing slurry from said crystallizing zone at a selected rate of flow while maintaining said repeated circulation through the crystalizing zone at a rate of flow equal to at least several times said selected rate of flow, for prolonged heat transfer between said solution and said surface, said circulation of solution along said surface being sufficiently rapid to promote heat exchange therewith by turbulence while said scraping of said surface is effected in rapid repetition to prevent the build-up of crystals from interfering with scraping contact upon said surface, continuously separating said purified naphthalene from said withdrawn flow of slurry to yield purified naphthalene product and used solvent liquor containing dissolved impurities and a dissolved remainder of naphthalene, returning a part of said solvent liquor to constitute, with a portion of pure solvent, the aforesaid solvent for the mixing step, and subjecting the remaining part of said solvent liquor to distillation to recover pure solvent therefrom.

30. A method as defined in claim 29, in which the solvent is methanol and in which said solvent and said crude naphthalene and said solution and slurry are maintained substantially free of water, said pure methanol recovered by said distillation step being returned for re-use in said portion of pure methanol constituted in the solvent for the mixing step.

31. A method as defined in claim 30, in which the separated purified naphthalene from the withdrawn flow of slurry is subjected in melted form, to distillation for separation of entrained methanol therefrom, said distillation providing pure methanol which is also returned for re-use in said portion of pure methanol constituted in the solvent for the mixing step.

References Cited

UNITED STATES PATENTS

| | | | |
|---|---|---|---|
| 2,321,117 | 6/1943 | Wilcock | 260—674 |
| 2,336,244 | 12/1943 | Happel | 260—674 |
| 2,598,449 | 5/1952 | Scott et al. | 260—674 |
| 2,686,818 | 8/1954 | Smith | 260—674 |
| 2,777,889 | 1/1957 | Naumann | 260—674 |
| 2,866,833 | 12/1958 | Spiller | 260—674 |
| 2,881,230 | 4/1959 | Buell | 260—674 |
| 3,113,161 | 12/1963 | Schmalenbach | 260—674 |
| 3,197,524 | 7/1965 | Backlund | 260—674 |

PAUL M. COUGHLAN, Jr., Primary Examiner

C. E. SPRESSER, Jr., Assistant Examiner